US011325634B1

(12) United States Patent
Szczerba et al.

(10) Patent No.: US 11,325,634 B1
(45) Date of Patent: May 10, 2022

(54) MULTIFUNCTION ADAPTIVE STEERING WHEEL CONTROL

(71) Applicant: GM GLOBAL TECHNOLOGY OPERATIONS LLC, Detroit, MI (US)

(72) Inventors: Joseph F. Szczerba, Grand Blanc, MI (US); Ki Hyun Ahn, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/120,397

(22) Filed: Dec. 14, 2020

(51) Int. Cl.
*B62D 1/06* (2006.01)
*B62D 1/04* (2006.01)

(52) U.S. Cl.
CPC ............. *B62D 1/046* (2013.01); *B62D 1/06* (2013.01)

(58) Field of Classification Search
CPC ............. B62D 1/04; B62D 1/046; B62D 1/10
See application file for complete search history.

(56) References Cited

U.S. PATENT DOCUMENTS

| 2003/0023353 | A1* | 1/2003 | Badarneh | B62D 1/046 |
| | | | | 701/1 |
| 2016/0347178 | A1* | 12/2016 | Ha | B60K 37/06 |
| 2019/0139718 | A1* | 5/2019 | Ichikawa | H01H 9/0207 |
| 2019/0375431 | A1* | 12/2019 | Garcia | B62D 1/046 |
| 2020/0320737 | A1* | 10/2020 | Schiebener | G06K 9/6271 |
| 2021/0265121 | A1* | 8/2021 | Mayville | H01H 21/04 |

FOREIGN PATENT DOCUMENTS

| FR | 3044729 A1 * | 6/2017 | .............. G05G 5/03 |
| JP | 2017146843 A * | 8/2017 | .............. G05G 5/03 |

OTHER PUBLICATIONS

"Degrees of freedom (mechanics)," Wikipedia Page, Dated by Wayback Machine to Nov. 12, 2018, url:<https://web.archive.org/web/20181112193418/https://en.wikipedia.org/wiki/Degrees_of_freedom_(mechanics)>.*
"Machine learning," Wikipedia Page, Dated by Wayback Machine to Jun. 27, 2019, url:<https://web.archive.org/web/20190627224014/https://en.wikipedia.org/wiki/Machine_learning#Relation_to_optimization>.*
Machine Translation of JP 2017-146843, obtained Oct. 15, 2021.*
Machine Translation of FR 3,044,729, obtained Oct. 15, 2021.*

* cited by examiner

*Primary Examiner* — Richard W Ridley
*Assistant Examiner* — Brian J McGovern

(57) ABSTRACT

A vehicle system comprising a steering wheel that includes: i) a hub adapted to be mounted on a steering column of the vehicle system; ii) a steering wheel rim coupled to the hub; and iii) a first control movably coupled to the hub. The first control moves from a first position proximate a first location on the steering wheel rim to a second position proximate a second location on the steering wheel rim. This maintains the first control in proximity to a first hand of a driver as the first hand moves from the first location to the second location on the steering wheel rim. The vehicle system further comprises a control module configured to move the first control from the first position to the second position.

20 Claims, 10 Drawing Sheets

241,
242

241,
242

241,
242

MULTIFUNCTION ADAPTIVE STEERING WHEEL CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Conventional steering wheel controls have a limited number of uses and are typically located in a single position or location that may not be the preferred position of the driver. The present disclosure relates to steering wheel controls that may be operated from either the front or the back or both of the steering wheel. Magnetorheological fluid modifies the detents and forces required in coordination with the system or feature selected. Multifunctional control is manually adjustable around a steering wheel hub periphery for added comfort. A smart system learns user habits, detect hand position, and re-positions the steering wheel control when necessary.

SUMMARY

It is an object of the present disclosure to provide a vehicle system comprising a steering wheel that includes: i) a hub adapted to be mounted on a steering column of the vehicle system; ii) a steering wheel rim coupled to the hub; and iii) a first control movably coupled to the hub. The first control is configured to be moved from a first position proximate a first location on the steering wheel rim to a second position proximate a second location on the steering wheel rim, so that the first control is maintained in proximity to a first hand of a driver as the first hand moves from the first location to the second location on the steering wheel rim.

In one embodiment, the vehicle system further comprises a control module configured to move the first control from the first position to the second position.

In another embodiment, the first control comprises a knob that may be toggled in a first orthogonal orientation and in a second orthogonal orientation that is perpendicular to the first orthogonal orientation.

In still another embodiment, the knob may be rotated in a clockwise direction and in a counterclockwise direction.

In yet another embodiment, the knob comprises a button that may be pressed and released.

In a further embodiment, the control module is configured to at least one of: i) modify one or more detents associated with the knob; and ii) modify a magnetorheological fluid associated with the knob.

In a still further embodiment, the hub further comprises a first actuator coupled to the first control and wherein the control module is configured to control the first actuator to move the first control from the first position to the second position.

In a yet further embodiment, the steering wheel further comprises a second control movably coupled to the hub. The second control is configured to be moved from a third position proximate a third location on the steering wheel rim to a fourth position proximate a fourth location on the steering wheel rim. The second control is maintained in proximity to a second hand of the driver as the second hand moves from the third location to the fourth location on the steering wheel rim.

In one embodiment, the second control may be moved above the horizontal centerline and may be moved below the horizontal centerline.

In another embodiment, the control module is configured to move the second control from the third position to the fourth position.

In still another embodiment, the control module is configured to move the first and second controls independently.

In yet another embodiment, the control module is configured to move the first and second controls based on driver preference information stored in a memory associated with the control module.

In a further embodiment, the control module is configured to execute a machine-learning algorithm that determines the driver preference information.

In a still further embodiment, the first and second controls are movable manually by the driver.

It is another object of the present disclosure to provide, in a vehicle system comprising a steering wheel, the steering wheel including a hub, a steering wheel rim coupled to the hub, and a first control movably coupled to the hub, a method of operating the first control. The method comprises: i) detecting that a first hand of a driver has moved from a first location on the steering wheel rim to a second location on the steering wheel rim; and ii) moving the first control from a first position proximate the first location on the steering wheel rim to a second position proximate a second location on the steering wheel rim.

In one embodiment, the method further comprises at least one of: i) modifying one or more detents associated with the first control; and ii) modifying a magnetorheological fluid associated with the first control.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes an adaptive system that an 8-way multifunctional adaptive steering wheel control that can be operated from either side of steering wheel (front, back, or both). The adaptive steering wheel control includes magnetorheological fluid that creates environment (or context) specific detents and force(s) relative to the system or feature selected by the driver. The position or location of the adaptive steering wheel control may be manually adjusted along the steering wheel hub to optimize usability and comfort. Advantageously, a smart system automatically re-positions the adaptive steering wheel control if necessary based on user preferences and driving environment (or context).

The magnetorheological fluid (MRF) provides precise and appropriate control detents and forces based on a selected system feature. For example, the detents in the adaptive steering wheel control may be unique between changing audio volume compared to changing the HVAC settings. Additionally, in a smart system, the MRF changes the resistant torque and the detents based on different drivers and HMI information. The driver may manually move the adaptive steering wheel control along the steering wheel hub to optimize position for enhanced usability and comfort. Additionally, adaptive steering wheel controls on the right side and the left side of the steering wheel may be adjusted independently. The adaptive steering wheel control slides along a track or slot that is integrated into the side of the steering wheel hub.

Figure 1:
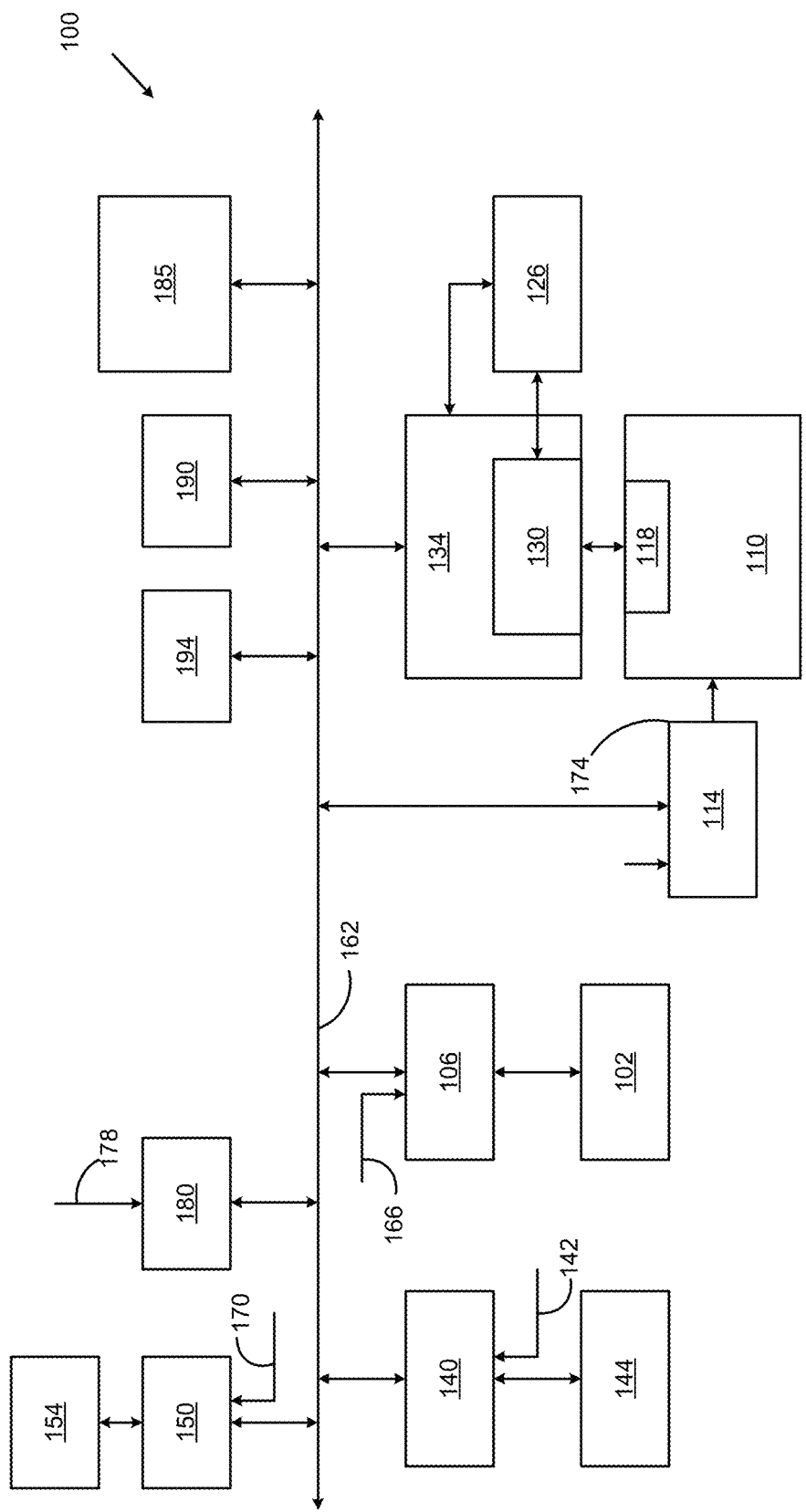
FIG. 1 is a functional block diagram of an exemplary vehicle system that includes a multifunction adaptive steering wheel control according to an embodiment of the present disclosure.

FIG. 1 is a functional block diagram of an exemplary vehicle system 100 that includes a multifunction adaptive steering wheel control according to an embodiment of the present disclosure. While a vehicle system for a manually driven hybrid vehicle is shown and described, the present disclosure is also applicable to autonomously driven vehicles and to all-electric vehicles. The present disclosure may also be applicable to non-automobile implementations, such as trains, boats and aircraft.

An engine 102 combusts an air/fuel mixture to generate drive torque. An engine control module (ECM) 106 controls the engine 102 based on one or more driver or vehicle inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1A. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel 194 within the vehicle and/or steering commands from one or more vehicle control modules. A steering wheel angle sensor (SWA) monitors rotational position of the steering wheel 194 and generates a SWA 142 signal based on the position of the steering wheel. As an example, the steering control module 140 may control vehicle steering via an EPS motor 144 based on the SWA 142 signal. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 that may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 100 further comprises an advanced computing module 185, a sensors module 190, and a steering wheel 194. The steering wheel 194 comprises a multifunction adaptive steering wheel control, as described below. In an exemplary embodiment, the multifunction adaptive steering wheel control may be an 8-way multifunction controller. Advantageously, both the driver and the advanced computing module 185 may adjust the position (or location) of the 8-way multifunction adaptive steering wheel control according to the principles of the present invention.

The sensors module 190 may include a plurality of sensors distributed through the vehicle system 100 that gather important information. The sensor information may include on-board sensor inputs, such as a steering wheel capacitive sensor, a steering wheel force sensor, a temperature sensor, a facial recognition sensor, a heart rate sensor, and a key fob. The sensors module 190 may also include a vehicle speed sensor, a steering wheel angle sensor data, brake status data. LiDAR system data, radar data, camera images, accelerometer data, engine temperature and RPM, and the like to determine the speed, direction, and location of the vehicle system 100. The sensor information also may include off-board sensor inputs, such as GPS data, traffic report data, satellite data, vehicle-to-vehicle data, a roadmap database, weather reports, and cellular data.

The advanced computing module 185 comprises a high performance computing platform that controls many of the higher order functions and lower order functions of the vehicle system 100. In a typical implementation, the advanced computing module 185 may comprise a microprocessor and an associated memory. The advanced computing module 185 executes a kernel program that controls the overall operation of the advanced computing module 185. According to the principles of the present disclosure, the advanced computing module 185 controls and adjusts the position of the 8-way multifunction adaptive steering wheel control based on stored driver preferences and driver inputs.

Figure 2:
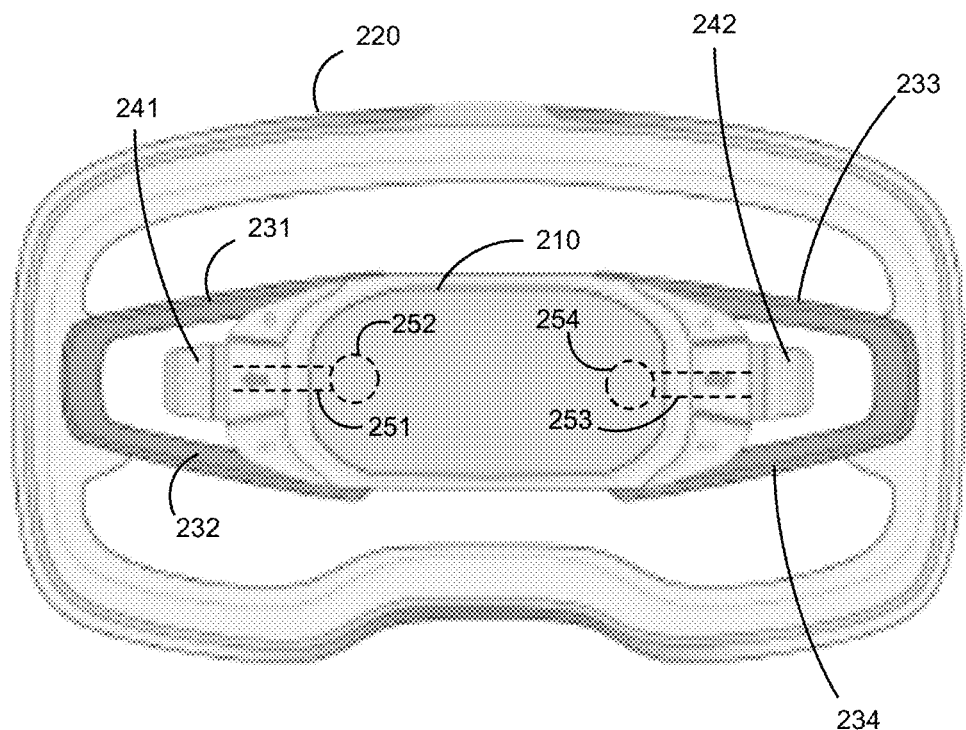
FIG. 2 is a diagram of a steering wheel including a multifunction adaptive steering wheel control according to an embodiment of the present disclosure.

According to an advantageous embodiment, advanced computing module 185 may comprise a "smart system" that executes one or machine learning algorithms. The advanced computing module 185 receives a plurality of inputs including, but not limited to, multifunction (MF) steering wheel control commands, sensor data, .mp4 data, HVAC commands, mobile phone commands and signals, radio commands, and navigation data (i.e., GPS data), The advanced computing module 185 may also receive driver selection informal, hand location information, and control use data. The advanced computing module 185 generates system outputs, including, but not limited to, magnetorheological fluid adjustment commands and automatic control location commands, FIG. 2 is a diagram of a steering wheel 194 including multifunction (MF) adaptive steering wheel controls 241, 242 according to an embodiment of the present disclosure. The steering wheel 194 comprises a hub 210 that is configured to be mounted on the steering column of the vehicle system 100. The steering wheel 194 further comprises a rim 220 that is connected to the hub 210 by a plurality of spokes, including left-side spokes 231 and 232 and right-side spokes 233 and 234.

In FIG. 2, MF adaptive steering wheel controls 241 and 242 are positioned in line with the horizontal center line of the steering wheel 194. MF adaptive steering wheel control 242 is located at the "3 o'clock" position (90 degrees to the right of vertical) and MT adaptive steering wheel control 241 is located at the "9 o'clock" position (90 degrees to the left of vertical). MF adaptive steering wheel controls 241 is located near the gap between the spokes 231 and 232 and MF adaptive steering wheel control 242 is located near the gap between the spokes 233 and 234. In this way, the driver can control the MF adaptive steering wheel controls 241 and 242 either from the front of the steering wheel 194 (using thumbs) or from the back of the steering wheel 194 (using, for example, index or middle fingers).

Dotted lines indicate components that are disposed internal to the hub 210. The MF adaptive steering wheel control 241 rotatably couples by a control arm 251 to a pivoting actuator 252 inside the hub 210. This allows the MF adaptive steering wheel control 241 to move upward, for example, to the "10 o'clock" position and move downward, for example, to the "8 o'clock" position. Likewise, the MF adaptive steering wheel control 242 rotatably couples by a control arm 253 to a pivoting actuator 254 inside the hub 210. This allows the MF adaptive steering wheel control 242 to move upward, for example, to the "2 o'clock" position and move downward, for example, to the "4 o'clock" position. Connecting wires (not shown) couple the MF adaptive steering wheel controls 241 and 242 through the control arms 251 and 253 to the CAN 162. The pivoting actuators 252 and 254 enable the advanced computing module 185 to automatically move the MF adaptive steering wheel controls 241 and 242, as described below.

Figure 3A:
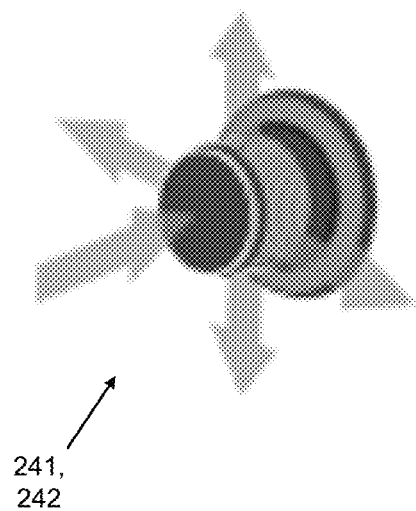
FIG. 3A illustrates operations of an 8-way multifunction adaptive steering wheel control according to an embodiment of the present disclosure.

FIG. 3A illustrates operations of the 8-way multifunction (MF) adaptive steering wheel controls 241 and 242 according to an embodiment of the present disclosure. In FIG. 3A, each of the MF adaptive steering wheel controls 241 and 242 comprises a knob that may be toggled upward or downward or towards the front or the back of the steering wheel 194 (four function positions or "ways"). More generally, the knob may be toggled in both directions in a first orthogonal orientation (e.g., up and down if the knob is initially pointed horizontally) and may also be toggled in both directions in a second orthogonal orientation (e.g., front and back if the knob is pointed horizontally) that is perpendicular to the first orthogonal orientation. Each of the MF adaptive steering wheel controls 241 and 242 also may be pressed inward or popped outward (two additional function positions or "ways").

Figure 3B:
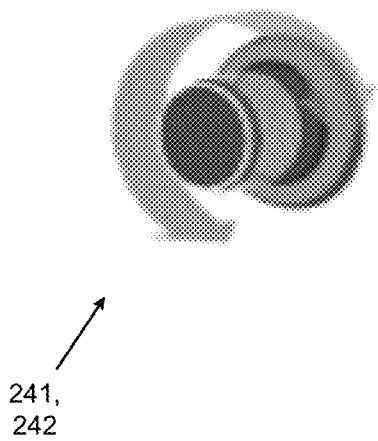
FIG. 3B illustrates further operations of an 8-way multifunction adaptive steering wheel control according to an embodiment of the present disclosure.

FIG. 3B illustrates further operations of 8-way multifunction (MF) adaptive steering wheel controls 241 and 242 according to an embodiment of the present disclosure. In FIG. 3B, each of the MF adaptive steering wheel controls 241 and 242 may be rotated clockwise or counterclockwise (two additional function positions or "ways" for a total of eight (8) ways).

Figure 4:
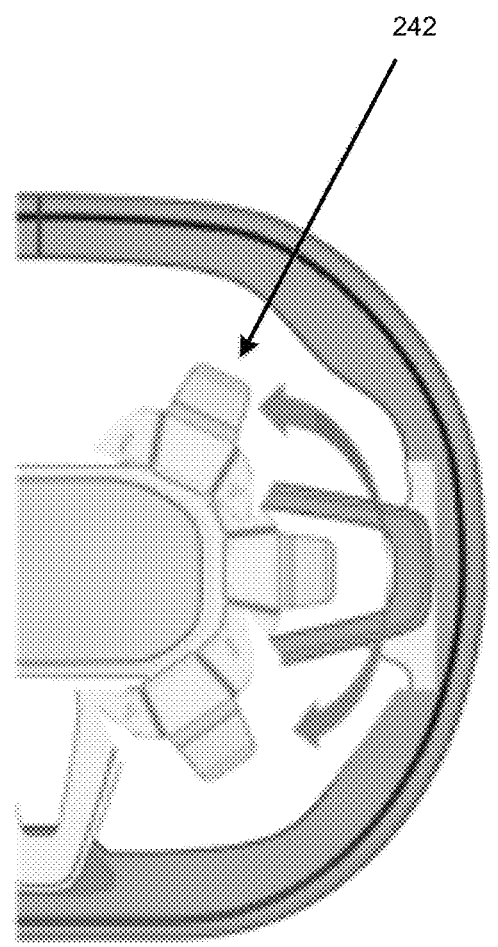
FIG. 4 illustrates adaptive positioning of an 8-way multifunction adaptive steering wheel control according to an embodiment of the present disclosure.

FIG. 4 illustrates adaptive positioning of the 8-way multifunction (MF) adaptive steering wheel control 242 according to an embodiment of the present disclosure. For simplicity, only the right side of the steering wheel 194 is illustrated. As shown, the MF adaptive steering wheel control 242 is able to move between the 2 o-clock position, the 3 o'clock position, and the 4 o'clock position. In this manner, the driver may place his or her hands in different positions on the steering wheel 194 and is still able to manipulate the MF adaptive steering wheel control 242.

Figure 5:
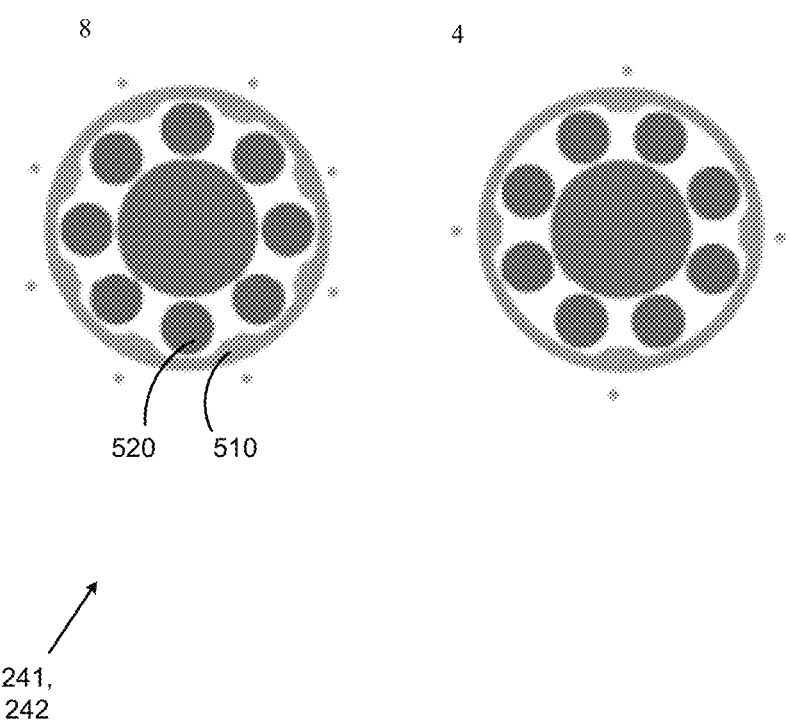
FIG. 5 illustrates in detail an 8-way multifunction adaptive steering wheel control according to an embodiment of the present disclosure.

FIG. 5 illustrates in detail the 8-way multifunction adaptive steering wheel controls 241 and 242 according to the principles of the present disclosure. FIG. 5 shows two different embodiments of the interiors of the multifunction adaptive steering wheel controls 241 and 242. On the left, the MF adaptive steering wheel controls comprise eight (8) detents that enable the MF adaptive steering wheel controls to be positioned at eight different steps or positions. On the right, the MF adaptive steering wheel controls comprise four (4) detents that enable the MF adaptive steering wheel controls to be positioned at four different steps or positions. As is well known, a detent is a device (e.g., catch, spring-operated ball, or the Ike) for positioning and holding one mechanical part in relation to another in a manner such that the device can be released by force applied to one of the parts. In FIG. 5, the detents comprise ridges, such as ridge 510, that engage ball bearings, such as ball bearing 520.

Figure 6:
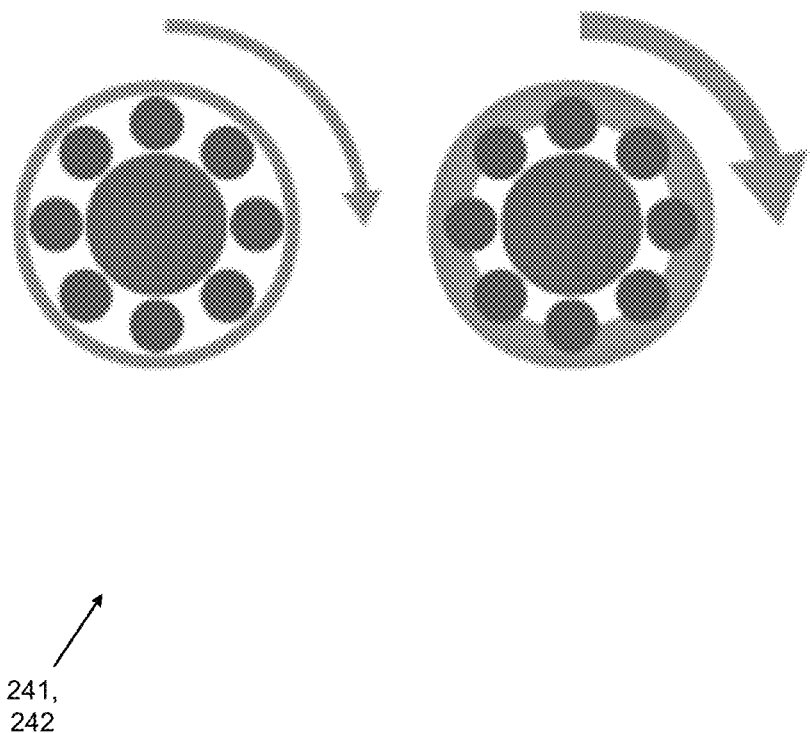
FIG. 6 illustrates in detail an 8-way multifunction adaptive steering wheel control according to an embodiment of the present disclosure.

FIG. 6 illustrates in detail the 8-way multifunction adaptive steering wheel controls 241 and 242 according to an embodiment of the present disclosure. In FIG. 6, the interiors of one or both of the 8-way multifunction adaptive steering wheel controls 241 and 242 comprise a magnetorheological fluid (MRF). A magnetorheological fluid is a type of smart fluid that is in a carrier fluid, such as oil. When subjected to a magnetic field, the MRF increases apparent viscosity—to the point where the MRF may become a viscoelastic solid. On the left side of FIG. 6, the MR fluid has lower viscosity, such that the multifunction adaptive steering wheel control encounters lower resistance as it spins freely. On the right side of FIG. 6, the MR fluid has higher viscosity, such that the multifunction adaptive steering wheel control encounters higher resistance as it spins freely. In the hub 210, an electrical current may create a magnetic field in a coil, which changes the properties of the MRF within the multifunction adaptive steering wheel controls 241 and 242.

Figure 7:
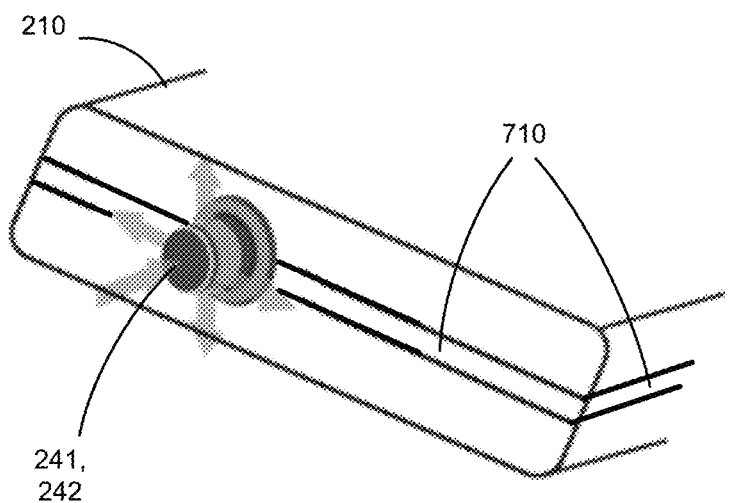
FIG. 7 illustrates selected portions of the steering wheel according to an embodiment of the present disclosure.

FIG. 7 illustrates selected portions of the steering wheel 194 according to an embodiment of the present disclosure. A slot 710 formed in the periphery of the hub 210 enables the multifunction adaptive steering wheel controls 241 and 242 to couple to the control arms 251 and 253 inside the hub 210. The slot 710 also guides the multifunction adaptive steering wheel controls 241 and 242 as the multifunction adaptive steering wheel controls 241 and 242 move between positions.

Figure 8A:
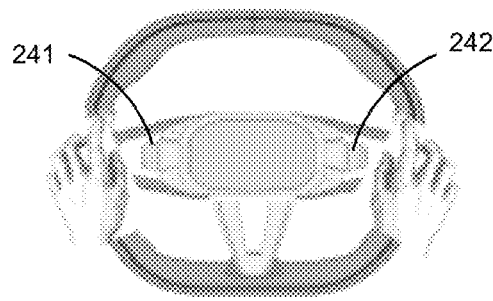
FIGS. 8A-8D illustrate exemplary hand positions and locations of an 8-way multifunction adaptive steering wheel control according to an embodiment of the present disclosure.
Figure 8B:
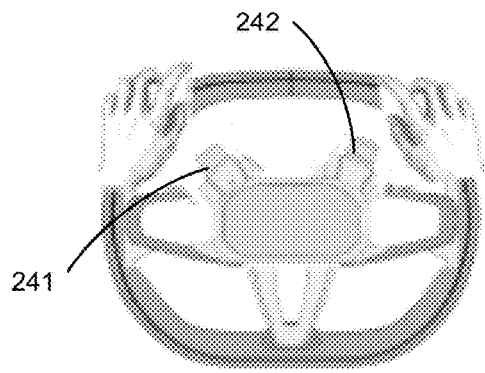
Figure 8C:
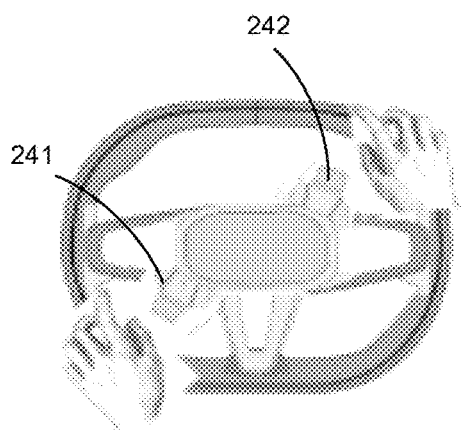
Figure 8D:
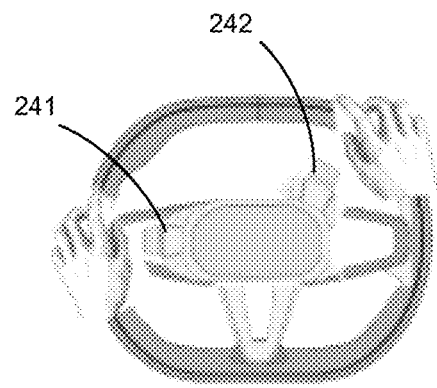

FIGS. 8A-8D illustrate exemplary hand positions and locations of the 8-way multifunction adaptive steering wheel controls 241 and 242 according to an embodiment of the present disclosure. In FIG. 8A, the multifunction adaptive steering wheel controls 241 and 242 are positioned at the 9 o'clock and 3 o'clock positions to match the left and right hands, respectively, of the driver. In FIG. 8B, the multifunction adaptive steering wheel controls 241 and 242 are positioned at the 10 o'clock and 2 o'clock positions to match the left and right hands, respectively of the driver. In FIG. 8C, the multifunction adaptive steering wheel controls 241 and 242 are positioned at the 8 o'clock and 2 o'clock positions to match the left and right hands, respectively, of the driver. In FIG. 8D, the multifunction adaptive steering wheel controls 241 and 242 are positioned at the 9 o'clock and 2 o'clock positions to match the left and right hands, respectively, of the driver. In all of the positions shown in FIGS. 8A-8D, the hands of the driver are able to manipulate the 8-way multifunction adaptive steering wheel controls 241 and 242 without requiring the driver to move his or her hands.

Figure 9A:
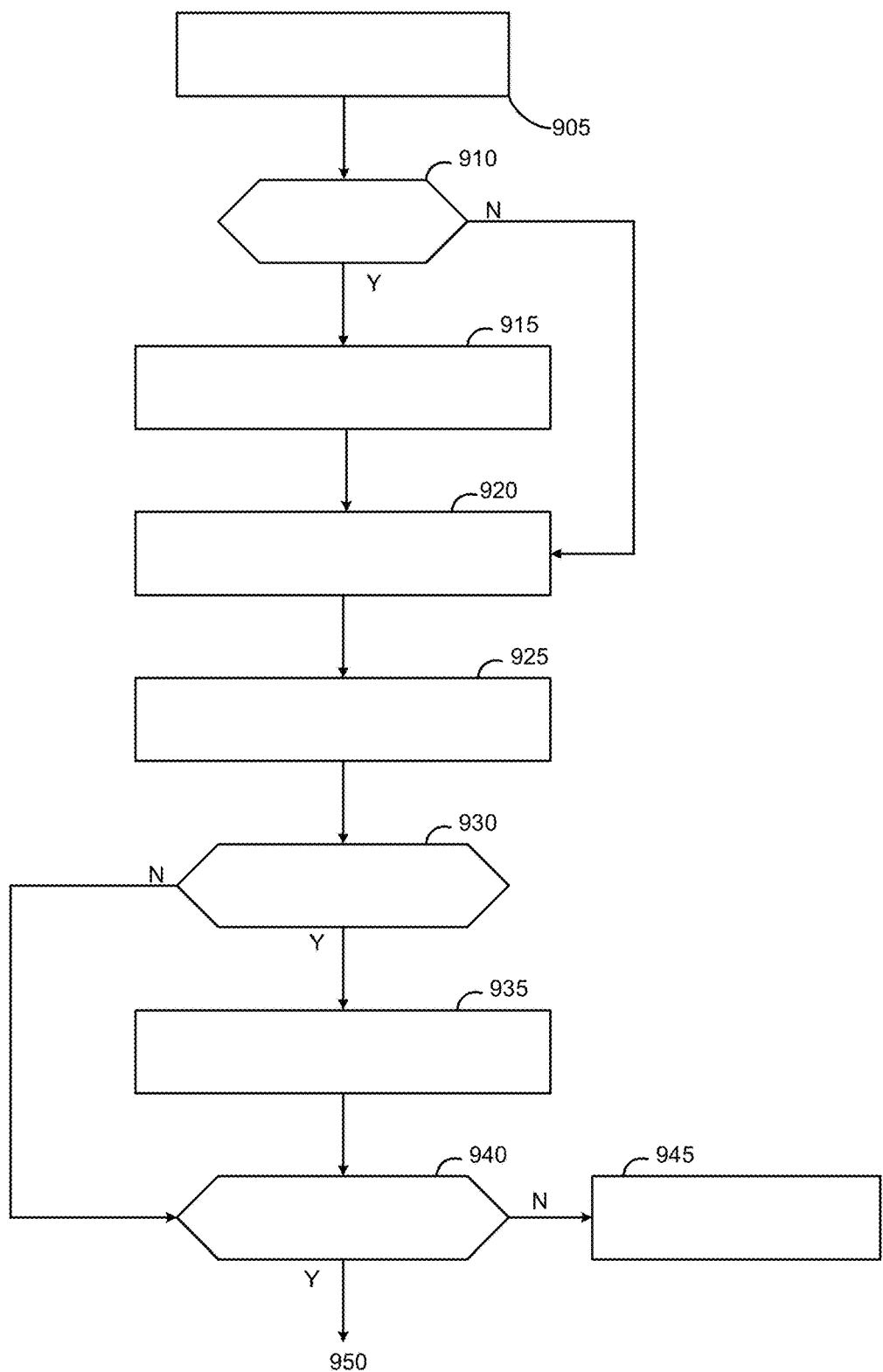
FIGS. 9A and 9B are a flow diagram illustrating operations of a smart system that includes the 8-way multifunction adaptive steering wheel control according to an embodiment of the present disclosure.
Figure 9B:
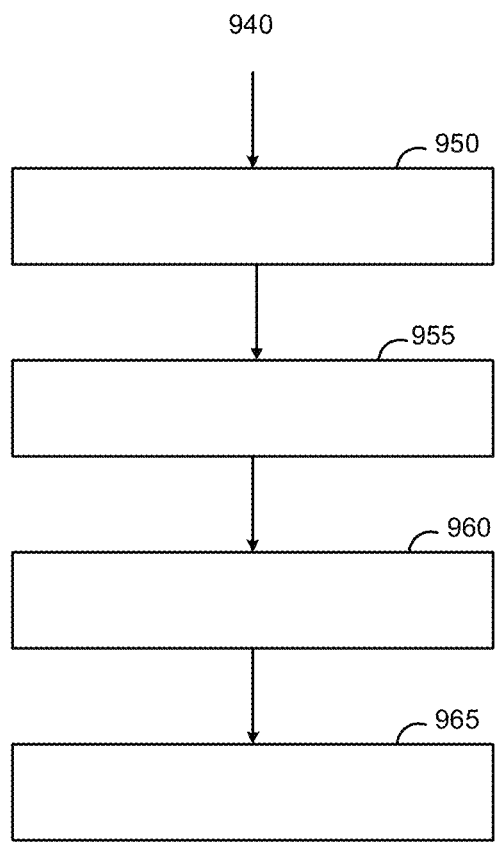

FIGS. 9A and 9B are a flow diagram illustrating operations of a smart system that includes the 8-way multifunction adaptive steering wheel controls 241 and 242 according to an embodiment of the present disclosure. In 905, the advanced computing module 185 in the vehicle system 100 determines the identity of the drivers when the driver enters the vehicle system 100. The advanced computing module 185 may identify the driver using one or more driver-identification sensors, including but not limited to a facial recognition system or other biometric sensors, a key fob, a keypad and password, and the like.

In 910, the advanced computing module 185 determines whether or not it is necessary to relocate either of the 8-way multifunction adaptive steering wheel controls 241 and 242 based on the identity of the driver. The driver preference settings may be stored in the memory associated with the advanced computing module 185. If No in 910, the driver in 920 may then operate the controls 241 and 242 to change the HVAC settings, adjust audio volume, select a radio station, operate the GPS navigation system, activate the windshield wipers, and the like. If Yes in 910, then the advanced computing module 185 in 915 moves one or both of the 8-way multifunction adaptive steering wheel controls 241 and 242 to the preferred settings. The driver in 920 may then operate the controls 241 and 242, as before.

In 925, the advanced computing module 185 may identify the infotainment features that the driver selected in 920. In response to the identify infotainment features, the advanced computing module 185 may determine if it is necessary to change the detents or the required force to use either of the 8-way multifunction (MF) adaptive steering wheel controls 241 and 242. If Yes in 930, the advanced computing module 185 in 935 may adjust the magnetorheological fluid (MRF) or the detents (or both) for correct system control.

After adjusting the MRF or the detents in 935, or if No in 930, the advanced computing module 185 may determine in 940 if the driver wants to change control location. The advanced computing module 185 may determine this, for example, by detecting the driver applying force to either of the MF controls 241 and 242 to move the MF control to a new location. Alternatively, the advanced computing module 185 may determine this if, for example, sensors in the steering wheel rim 220 detect that the driver has moved his or her hands to a new location on the steering wheel rim 220. If No in 940, the advanced computing module 185 in 945 leaves the MF adaptive steering wheel controls 241 and 242 in the current positions.

If Yes in 940, then in 950 either the driver or the advanced computing module 185 moves one or both of the 8-way multifunction adaptive steering wheel controls 241 and 242 to the new (and different) location. Once the driver operates the controls 241 and 242 in the new location, the advanced computing module 185 in 955, updates the driver preferences in memory with the new position information.

As noted above, in some embodiments, the advanced computing module 185 may comprise a "smart system 185" that executes one or machine learning algorithms that analyzes the habits and preferences of the driver. In 960, the smart system 185 may anticipate the desire of the driver to relocate control based on driving environment, such as higher speed driving, poor weather conditions, a winding road, the onset of rainfall, or the like. In response to the identified environment condition(s), the smart system 185 in 965 may relocate automatically one or both of the 8-way multifunction adaptive steering wheel controls 241 and 242. By way of example, the driver may typically move his hands to the 10 o'clock and 2 o'clock positions to get a better grip on the steering wheel rim 220 whenever it starts to rain. In a smart system 185, the machine-learning algorithm will typically identify this behavior and associate it with the onset of rainfall. As a result, the smart system 185 may automatically move the 8-way multifunction adaptive steering wheel controls 241 and 242 to the 10 o'clock and 2 o'clock positions as soon as sensors in the vehicle system 100 detect rain.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system comprising:
 a steering wheel comprising:
  a hub adapted to be mounted on a steering column of the vehicle system, the hub comprising a slot in a periphery of the hub;
  a steering wheel rim coupled to the hub; and
  a first control coupled to the hub in the slot, the first control being slidable in the slot along the periphery of the hub, wherein the first control is configured to be moved from a first position in the slot along the periphery of the hub, the first position being proximate to a first location on the steering wheel rim to a second position in the slot along the periphery of the hub, the second position being proximate to a second location on the steering wheel rim, such that the first control is maintained in proximity to a first hand of a driver as the first hand moves from the first location to the second location on the steering wheel rim.

2. The vehicle system as set forth in claim 1, further comprising a control module configured to move the first control from the first position to the second position based on sensing a force applied by the driver to the first control or based on sensing the first hand of the driver has moved from the first location to the second location on the steering wheel rim.

3. The vehicle system as set forth in claim 2, wherein the first control comprises a knob that may be toggled in a first orthogonal orientation and in a second orthogonal orientation that is perpendicular to the first orthogonal orientation.

4. The vehicle system as set forth in claim 3, wherein the knob may be rotated in a clockwise direction and in a counterclockwise direction.

5. The vehicle system as set forth in claim 4, wherein the knob comprises a button that may be pressed and released.

6. The vehicle system as set forth in claim 2, wherein the hub further comprises a first actuator coupled to the first control and wherein the control module is configured to control the first actuator to move the first control from the first position to the second position.

7. The vehicle system as set forth in claim 2, wherein the steering wheel further comprises:
a second control movably coupled to the hub, wherein the second control is configured to be moved from a third position proximate a third location on the steering wheel rim to a fourth position proximate a fourth location on the steering wheel rim, such that the second control may be maintained in proximity to a second hand of the driver as the second hand moves from the third location to the fourth location on the steering wheel rim.

8. The vehicle system as set forth in claim 7, wherein the second control may be moved above a horizontal centerline and may be moved below the horizontal centerline.

9. The vehicle system as set forth in claim 8, wherein the control module is configured to move the second control from the third position to the fourth position.

10. The vehicle system as set forth in claim 9, wherein the control module is configured to move the first and second controls independently.

11. The vehicle system as set forth in claim 10, wherein the control module is configured to move the first and second controls based on driver preference information stored in a memory associated with the control module.

12. The vehicle system as set forth in claim 11, wherein the control module is configured to execute a machine-learning algorithm that determines the driver preference information.

13. The vehicle system as set forth in claim 12, wherein the first and second controls are movable manually by the driver.

14. The vehicle system as set forth in claim 1, further comprising a control module is configured to at least one of:
modify one or more detents associated with the first control; and
modify a magnetorheological fluid associated with the first control by modifying current through a coil in the hub.

15. In a vehicle system comprising a steering wheel, the steering wheel including a hub comprising a slot in a periphery of the hub, a steering wheel rim coupled to the hub, and a first control coupled to the hub in the slot, the first control being slidable in the slot along the periphery of the hub, a method of operating the first control comprising:
detecting that a first hand of a driver has moved from a first location on the steering wheel rim to a second location on the steering wheel rim; and
moving the first control from a first position in the slot along the periphery of the hub, the first position being proximate to the first location on the steering wheel rim to a second position in the slot along the periphery of the hub, the second position being proximate to the second location on the steering wheel rim such that the first control is maintained in proximity to the first hand of the driver as the first hand moves from the first location to the second location on the steering wheel rim.

16. The method as set forth in claim 15, wherein the first position is above a horizontal centerline of the steering wheel rim and the second position is below the horizontal centerline.

17. The method as set forth in claim 15, further comprising at least one of:
modifying one or more detents associated with the first control; and
modifying a magnetorheological fluid associated with the first control by modifying current through a coil in the hub.

18. The method in claim 15, further comprising moving the first control from the first position to the second position based on sensing a force applied by the driver to the first control or based on sensing the first hand of the driver has moved from the first location to the second location on the steering wheel rim using machine learning.

19. The method as set forth in claim 18, wherein the steering wheel further includes a second control movably coupled to the hub, the method further comprising:
detecting that a second hand of the driver has moved from a third location on the steering wheel rim to a fourth location on the steering wheel rim; and
moving the second control from a third position proximate the third location on the steering wheel rim to a fourth position proximate the fourth location on the steering wheel rim.

20. The method as set forth in claim 19, further comprising moving the first and second controls based on driver preference information stored in a memory.

* * * * *